United States Patent
Griffin (10) Patent No.: US 10,752,311 B2
(45) Date of Patent: Aug. 25, 2020

(54) ADJUSTABLE TOE PEG FOR MOTORCYCLE

(71) Applicant: Matthew Griffin, Salt Lake City, UT (US)

(72) Inventor: Matthew Griffin, Salt Lake City, UT (US)

(73) Assignee: Performance Industries Manufacturing, Inc., Salt Lake City, UT (US)

(*) Notice: Subject to any disclaimer, the term of this patent is extended or adjusted under 35 U.S.C. 154(b) by 351 days.

(21) Appl. No.: 15/846,269

(22) Filed: Dec. 19, 2017

(65) Prior Publication Data
US 2019/0185097 A1    Jun. 20, 2019

(51) Int. Cl.
*B62J 25/00* (2020.01)
*B62L 3/04* (2006.01)
*B62M 25/06* (2006.01)

(52) U.S. Cl.
CPC .............. *B62J 25/00* (2013.01); *B62L 3/04* (2013.01); *B62M 25/06* (2013.01)

(58) Field of Classification Search
CPC ............. B62J 25/00; B62L 3/04; B62M 25/06
See application file for complete search history.

(56) References Cited

U.S. PATENT DOCUMENTS

| 5,779,254 A * | 7/1998 | James | B62J 25/00 180/219 |
| 6,217,050 B1 * | 4/2001 | Dickie | A61G 5/12 280/291 |
| 6,296,266 B1 * | 10/2001 | Martin | B62H 1/12 180/209 |
| 7,637,523 B2 * | 12/2009 | Fouhy | B62J 25/00 280/291 |
| 8,181,982 B1 * | 5/2012 | Ward | B62J 25/00 280/163 |
| 8,646,669 B2 * | 2/2014 | Mann | B62J 25/00 224/419 |
| 2015/0217826 A1 * | 8/2015 | Parvey | B62J 25/00 280/291 |

* cited by examiner

*Primary Examiner* — Jacob D Knutson
(74) *Attorney, Agent, or Firm* — Larson & Larson, P.A.; Justin P. Miller; Frank Liebenow (57) ABSTRACT

The adjustable toe peg allows a rider to adjust the toe peg position in two ways. First, the lever to which the toe peg attaches preferably includes a series of holes, about which the toe peg apparatus will rotate. Second, by placing the toe peg on a rotating member, which is held by a clamping force, the toe peg can be positioned at any angle.

14 Claims, 14 Drawing Sheets

ADJUSTABLE TOE PEG FOR MOTORCYCLE

FIELD

This invention relates to the field of motorcycle components and more particularly to an adjustable foot peg.

BACKGROUND

A rider must fit his motorcycle. Only with a proper fit can the rider be assured of maximum performance and safety.

A proper fit requires correctly placed controls. Given that both motorcycles and riders vary in size and shape, the stock motorcycle controls are often in unsatisfactory locations. Stock controls may also lack the range of adjustability required to fit a particular rider.

Foot controls in particular may lack the range, or granularity, of adjustment desired.

The foot controls are a key part of the rider's positioning and control. A rider rests his feet on foot pegs, and actuates toe pegs to operate the shifter and brake. The operation is divided by foot, with the left foot controlling the gear shifter, and the right foot controlling the rear brake.

What is needed is an adjustable foot peg and toe peg that allows a rider to customize the position of each to fit his specific size and preferences.

SUMMARY

The adjustable toe peg allows a rider to adjust the toe peg position in two ways. First, the lever to which the toe peg attaches preferably includes a series of holes, about which the toe peg apparatus will rotate. Second, by placing the toe peg on a rotating member, which is held by a clamping force, the toe peg can be positioned at any angle.

The mechanical focus of the disclosed device is the operation of the shifting and rear braking of a motorcycle. These functions are handled by a motorcycle's rearset.

A rearset includes: foot pegs; toes pegs; a brake lever for the rear brake; a shift lever; support brackets; and heel guards. Each of the rider's feet interacts with two parts of the rearset: a foot peg, on which the rider rests his heel, midfoot, or forefoot; and a toe peg, which the rider actuates with his forefoot to execute shifts or braking.

The rider chooses to rest his heel, midfoot, or forefoot on the foot peg depending upon his preferred riding position and whether he needs his foot in a position that will reach the toe peg.

Given that the rider rests his foot on the foot peg, the ability to adjust its position is critical, as the position affects the rider all the way up his body.

The position of the rider's foot affects positions of the calf, knee, and thigh. In turn, this affects leg position with respect to the gas tank, and potentially the rider's arms. All of these shifts affect the rider's balance and aerodynamic position.

The disclosed device permits adjustment of the foot peg and toe peg positions, allowing a rider to choose the ideal positions for himself and his motorcycle.

In addition to adjustment of the rider's position, he also interacts with the rearset to control the motorcycle. The toe pegs of the rearsets actuate the rear brake and shifter. During operation of the toe peg, the rider rests the heel of his foot on the foot peg, then moves the toe peg, which in turn moves a lever. When the rider is not operating the toe peg he may shift his foot to the rear. He will then rest the weight of his foot and leg, and potentially that of his entire body, on the foot peg.

On the left side, or shifter side, the rider pushes down on toe peg to downshift, and pull up on toe peg to upshift. The toe peg rotates a shift lever, moving a shift linkage, and actuating the transmission.

On right side, or brake side, the rider pushes down on toe peg to brake. The toe peg rotates a brake lever, moving a brake linkage, and actuating the rear brake.

The disclosed mechanisms use different mechanical means of permitting adjustment of the foot peg and toe peg positions, while fixing the positions in place once chosen.

First, the foot peg. The foot peg is affixed to a pivoting member. Alternatively, the pivoting member includes a protrusion that forms a foot peg.

The pivoting member is rotatable with respect to a mounting point on a bracket, the bracket affixed to the motorcycle.

Given that the rider may rest his weight on the foot peg, the mechanism that maintains its position must be sturdy. To prevent unintended rotation, an adapter plate is optionally placed between the pivoting member and the mounting bracket. The adapter plate acts to fix the rotational position of the arm at certain positions by locking rotation with respect to the pivoting arm, and locking rotation with respect to the mounting bracket.

The angular position of the adapter plate is fixed with respect to the bracket using a rectangular protrusion. The rectangular protrusion of the adapter plate fits within a rectangular pocket of the mounting bracket. The protrusion and pocket need not be rectangular, but can be other shapes that prevent relative rotation. For example, a matched set of triangular shapes, ovals, or hexagons.

The benefit of using a rectangular or square protrusion is that, if only smaller in one dimension, the protrusion can slide within an oversized rectangular pocket. This allows the adapter plate to retain its anti-rotation ability while permitting adjustability of the lateral position.

The illustrated embodiment uses a projection that is wider left-to-right than the pocket, allowing sliding between multiple mounting positions. To change position, the fastener that passes through the pivoting member is removed, the adapter plate slid, and then the fastener reinstalled at a chosen position.

On the opposite side of the adapter plate, the angular position is fixed with respect to the pivoting member using interlocking tabs. Tabs that protrude from the pivoting member sit within the spaces between the corresponding tabs of the adapter plate. A force on the foot peg attempts to cause rotation, which is held against by the tabs resting against one-another.

Preferably the tabs are positioned every 45 degrees. Thus, the tabs on one surface are set at 45 degree increments, and offset by 22.5 degrees on the corresponding surface. For example, on the adapter plate, tabs at angles of 0, 45, 90, 135, 180, 225, 270, and 315 degrees; and on the pivoting member, tabs at angles of 22.5, 67.5, 112.5, 157.5, 202.5, 247.5, 292.5, and 337.5 degrees. The width of each tab fills 22.5 degrees, with a subtraction for tolerance to create a clearance fit between the parts.

Ideally the angular positions mirror across a vertical line, allowing the same adapter plate to be used on either side of the motorcycle, with matching left/right side pivoting member positions. For example, the tab positions of 0, 45, 90, 135, 180, 225, 270, and 315 degrees, mirror as 0, 45, 90, 135, 180, 225, 270, and 315 degrees.

To change the angular position of the pivoting member, the fastener that passes through the pivoting member is loosened from the adapter plate, the pivoting member rotated, and then the fastener is tightened to maintain the chosen position.

Alternatives exist to interlocking tabs. The adapter plate may include holes that match with pins protruding from the pivoting member. Or tabs protruding from the pivoting member may interface with pockets in the adapter plate. A keyed or splined shaft may be used, or two interlocking splined surfaces.

The toe peg is discussed next. While the toe peg also fixes the position of a rotating member in order to hold a position, the position is fixed using compression. The rider applies a load to the toe peg in order to shift or brake, but he does not rest the weight of his body on the toe peg. Thus, the ability of the toe peg to hold an angular position need not be as robust as that of the foot peg, and instead can be more adjustable.

The toe peg freely rotates on a toe peg axle. The toe peg axle is affixed to the end of a rotating member.

The rotating member includes a projection for insertion into a clamping segment of a brake or shift lever. Prior to clamping, the rotating member can rotate along a plane parallel with the clamping segment. With the rotating member held at the desired angular position, a clamping fastener is tightened. As the clamping fastener is tightened, it brings an upper half and a lower half closer to each other, compressing the projection between.

The clamping segment preferably includes multiple penetrations, thus providing multiple locations for insertion of the protrusion. The result is multiple locations about which the rotating member can pivot.

The protrusion includes an optional circumferential channel to prevent interference with the compression fastener. By including a channel, the protrusion diameter can be increased, the fastener diameter increased, and the spacing reduced, all without creating interference between the compression fastener and the projection.

Given that the projection resists rotation using friction, increasing the compression force increases the frictional force, and increasing the surface area prevents the parts from gouging one another.

Thus, the inclusion of the optional circumferential channel increases the ability of the rotating member to resist changes to its angular position while under compression.

The clamping section includes an optional cut on one or both sides of the compression area. The cut removes material that would otherwise inhibit movement of the upper half toward the lower half, and thus would inhibit compression.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

Figure 1:
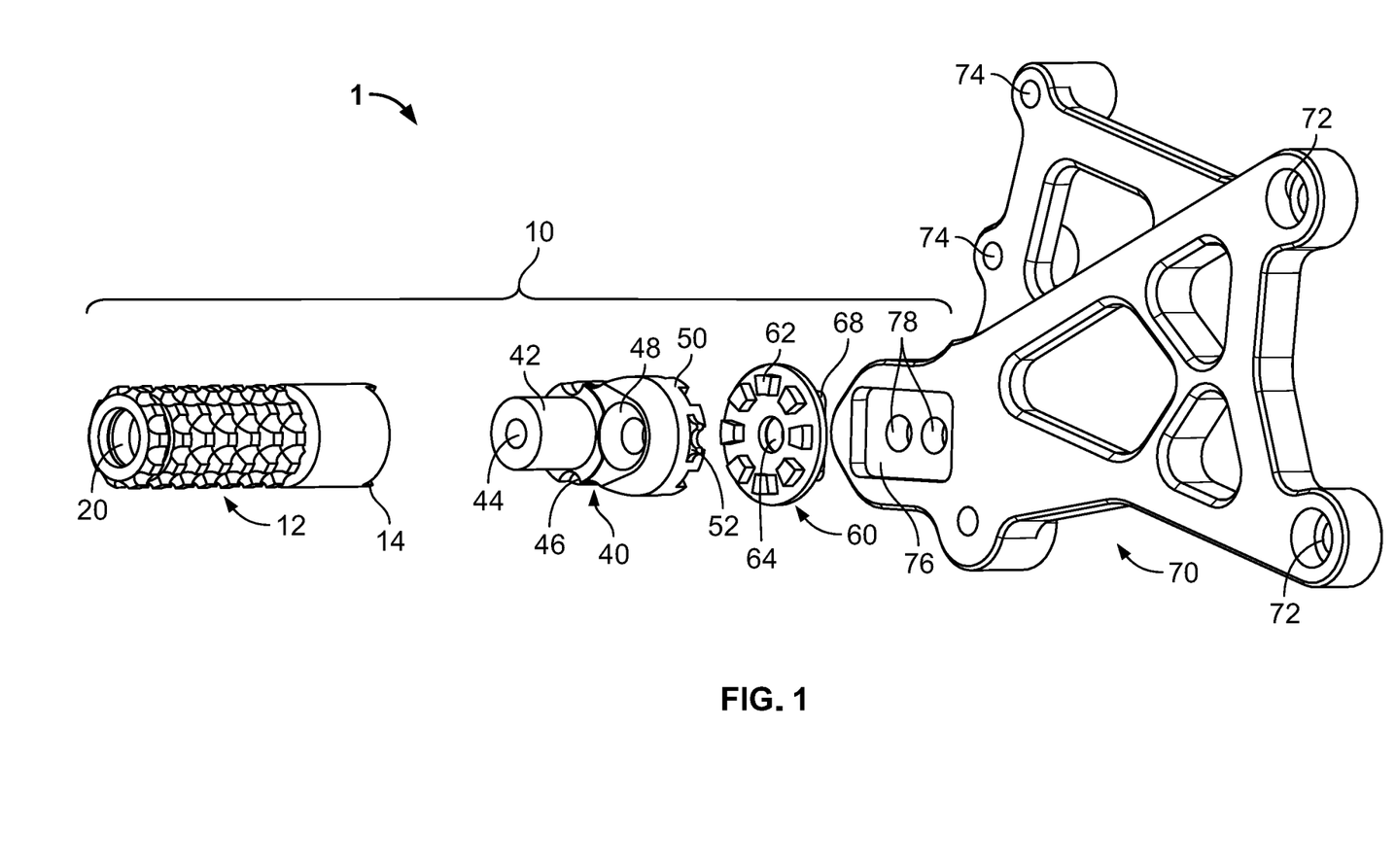
FIG. 1 is an exploded view of the foot peg assembly without fasteners.

Referring to FIG. 1, an exploded view of the foot peg assembly without fasteners is shown.

The rearset with adjustable foot peg 1 is formed primarily from the foot peg assembly 10. Foot peg assembly 10 includes the foot peg 12, which slides over the pivoting member projection 42 of the pivoting member 40.

The pivoting member 40 includes multiple pivoting member tabs 50, which interface with adapter plate tabs 62 of the adapter plate 60. The adapter plate rectangular projection 68 fits within the rotation-locking pocket 76 of the mounting bracket 70.

Foot peg assembly 10 further includes the foot peg 12, with foot peg anti-rotation projections 14 that fit into the pivoting member anti-rotation recess 46 of the pivoting member 40.

Figure 2:
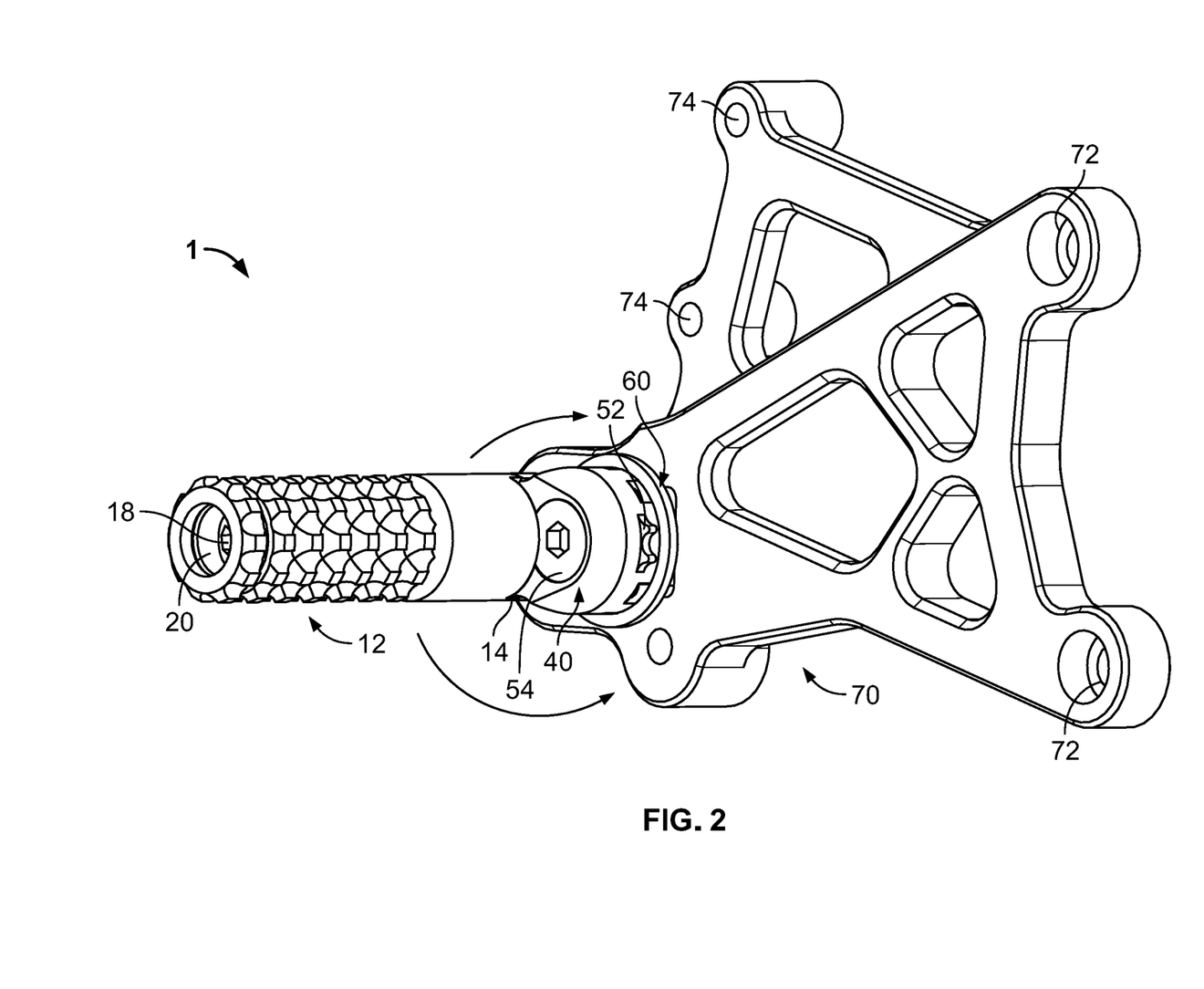
FIG. 2 is a collapsed view of the foot peg assembly with fasteners.

Referring to FIG. 2, a collapsed view of the foot peg assembly with fasteners is shown.

Pivoting member fastener 54 passes through the pivoting member 40, adapter plate 60, and mounting bracket 70. The mounting bracket 70 includes threaded positioning holes 78 (see FIG. 1) to interface with pivoting member fastener 54, or may use a threaded nut against its opposite face.

Foot peg fastener 18 affixes the foot peg 12 to the pivoting member 40 by threading into the internal projection threads 44 (see FIG. 1) of pivoting member projection 42.

The foot peg 12 includes foot peg fastener bore 20 for a foot peg fastener 18 that is covered by an optional foot peg cap (not shown).

Figure 3:
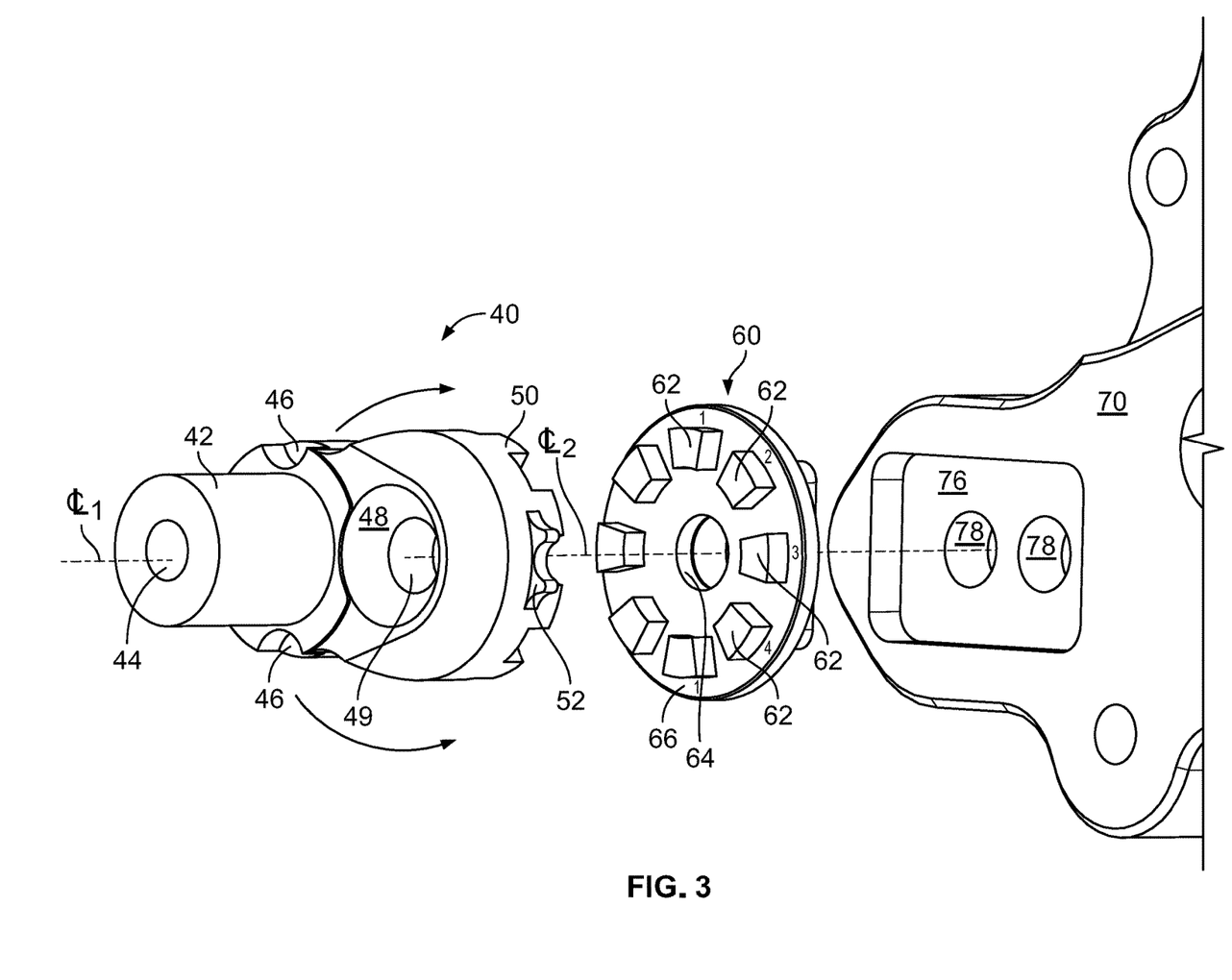
FIG. 3 is a close-up of a selection of foot peg parts without fasteners.

Referring to FIG. 3, a close-up of a selection of parts without fasteners is shown.

The foot peg 12 (see FIG. 2) slides over the pivoting member projection 42 of pivoting member 40. The foot peg fastener 18 (see FIG. 2) interfaces with the internal projection threads 44 of the pivoting member 40 at ₵ 1.

One or more foot peg anti-rotation projections 14 (see FIG. 7) interface with one or more pivoting member anti-rotation recesses 46. The foot peg resting face 28 (see FIG. 7) is ideally in contact with the pivoting member resting face 45.

When installed, the pivoting member bore 49 lines up with adapter plate bore 64, which in turn lines up with the selected positioning hole 78 of the mounting bracket 70. All members rotate about ₵ 2, which lines up with the selected positioning hole 78.

An optional countersink 48 allows the pivoting member fastener 54 (see FIG. 2) to recess within the pivoting member. The pivoting member fastener 54 (see FIG. 2) passes through the pivoting member 40 and adapter plate 60, then either threads into the positioning holes 78 of the mounting bracket 70, or passes through to a nut behind the mounting bracket 70.

The pivoting member tabs 50 fit in the spaces between the adapter plate tabs 62, fixing the chosen angular position. The pivoting member tabs are shown placed at 45-degree increments, but any angular separation is anticipated.

The position indicator 52 reveals the appropriate adapter plate position marking 66, allowing the rider to match angular position across sides of the motorcycle, as well as set specific desired positions.

The adapter plate 60 includes one face with adapter plate tabs 62, and an opposing face with an adapter plate rectangular projection 68. The adapter plate rectangular projection 68 fits within the rotation-locking pocket 76 of the mounting bracket 70.

Figure 4:
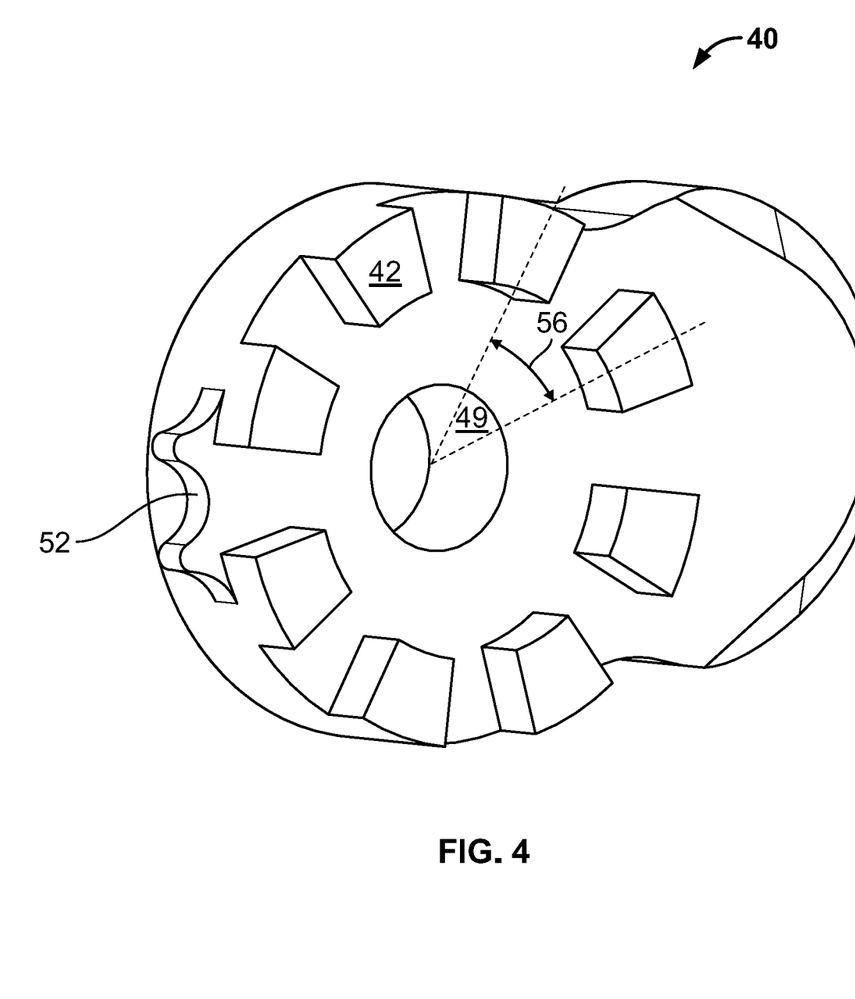
FIG. 4 is a rear view of the rotating member.

Referring to FIG. 4, a rear view of the rotating member is shown.

The pivoting member projections 42 are offset from each other by a pivoting member step angle 56.

Figure 5:
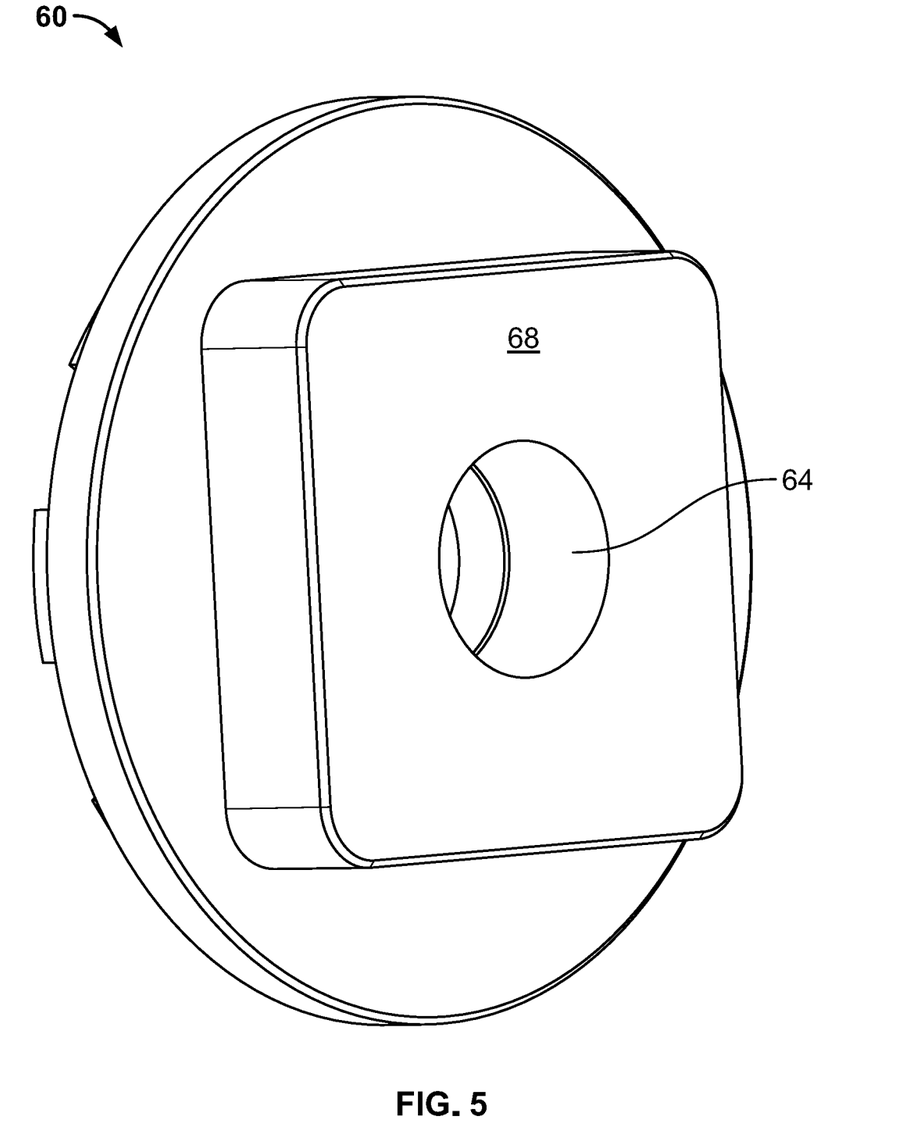
FIG. 5 is a rear view of the adapter plate.

Referring to FIG. 5, a rear view of the adapter plate is shown.

The adapter plate rectangular projection 68 is shown protruding from the adapter plate 60. Optional rounded corners ease repositioning the projection 68 within the rotation-locking pocket 76 of the mounting bracket 70.

Figure 6:
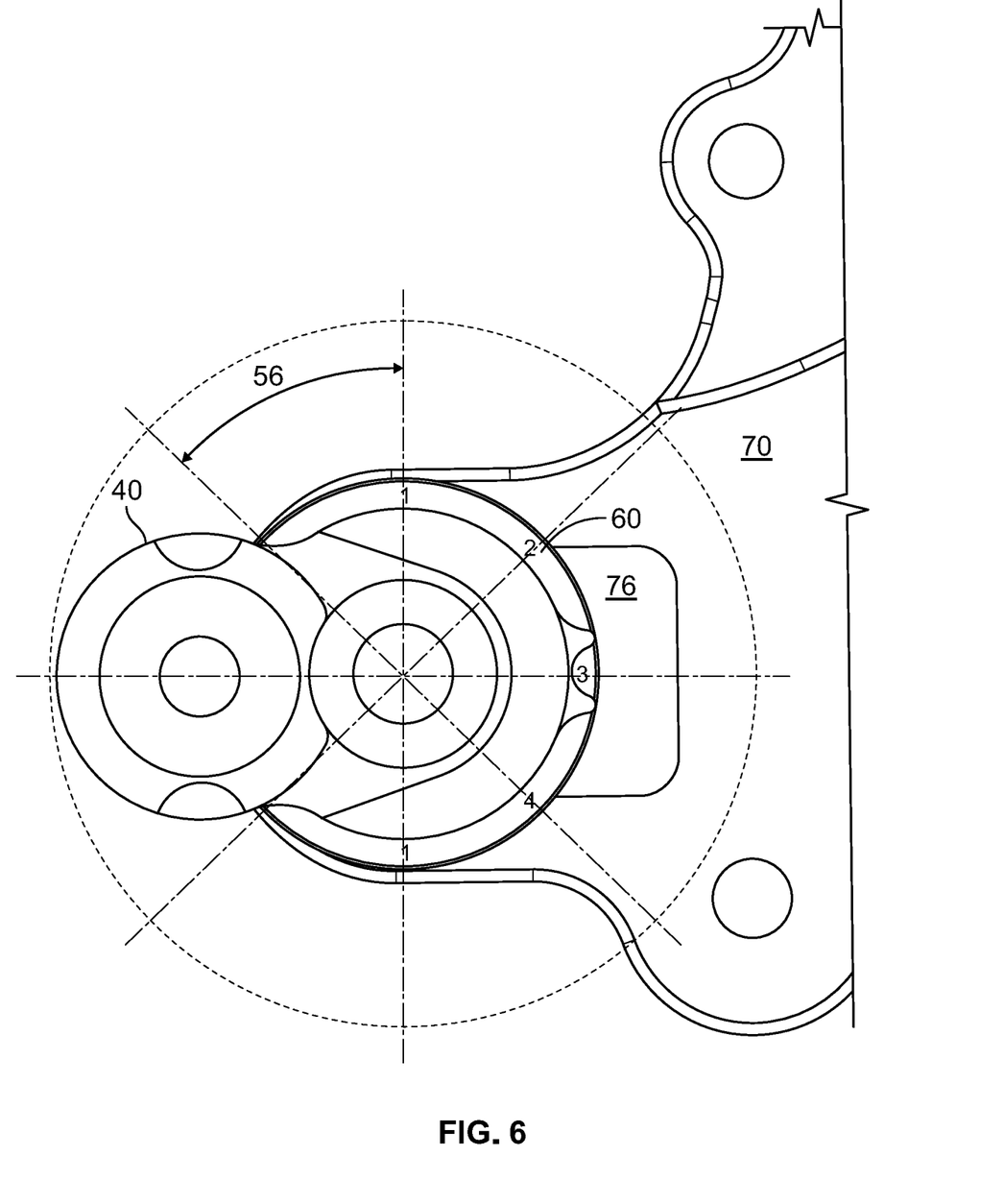
FIG. 6 is a front view of the foot peg assembly, showing angles of foot peg rotation.

Referring to FIG. 6, a front view of the foot peg assembly, showing angles of foot peg rotation is shown.

The pivoting member 40 can be rotated to any position that is a multiple of the pivoting member step angle 56. Here, the pivoting member step angle 56 is 45°, and thus the positions of the pivoting member 40 are 0°, 45°, 90°, 135°, 180°, 225°, 270°.

The adapter plate 60 is shown affixed to the leftmost positioning hole 78 (see FIG. 1) within the rotation-locking pocket 76. If the adapter plate 60 was in the rightmost positioning hole 78, a new set of eight angular positions would be available for the adapter plate 60.

Figure 7:
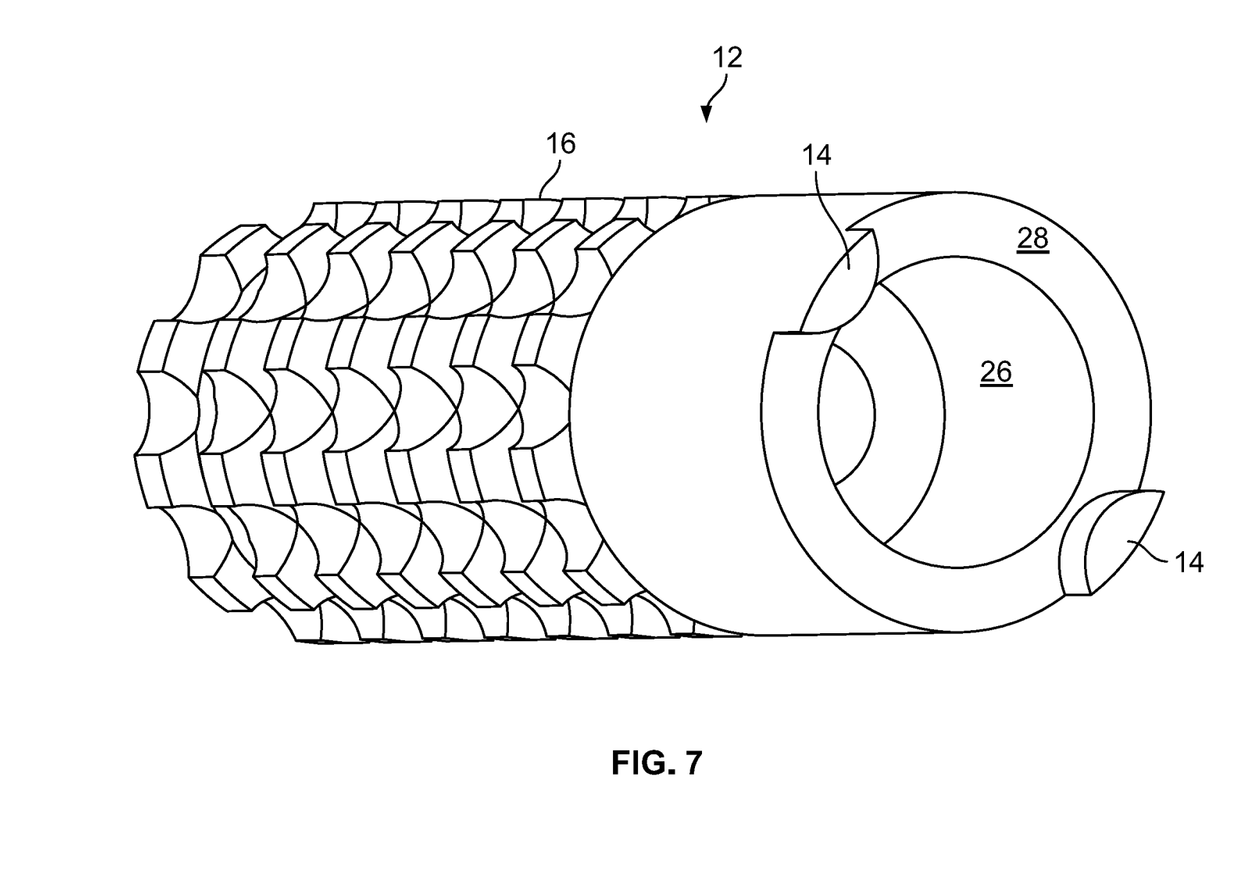
FIG. 7 is a rear view of the foot peg.

Referring to FIG. 7, a rear view of the foot peg is shown.

The foot peg 12 optionally includes one or more foot peg anti-rotation projections 14 that interface with the pivoting member to prevent rotation of the foot peg 12. Optional knurling 16 helps to maintain the rider's foot position during use.

A foot peg load-bearing recess 26 slides over the pivoting member projection 42 (see FIG. 3), helping to carry the weight of the rider from the foot peg 12 toward the mounting bracket 70 (see FIG. 2), and ultimately the motorcycle.

The foot peg resting face 28 contacts the pivoting member resting face 45 (see FIG. 3) of the pivoting member 40 (see FIG. 3).

Figure 8:
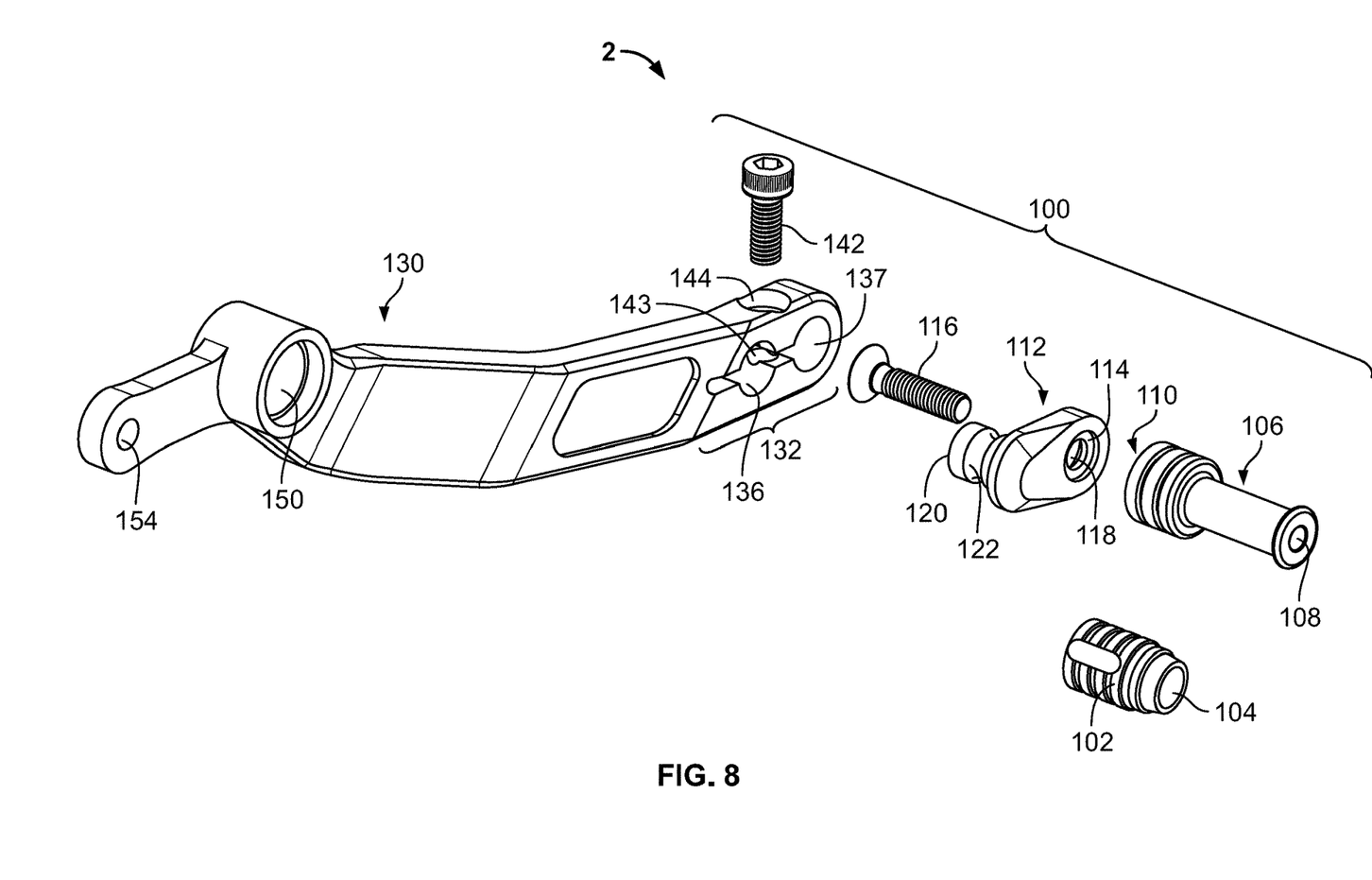
FIG. 8 is an exploded view of the toe peg assembly.

Referring to FIG. 8, an exploded view of the toe peg assembly is shown.

The rearset with adjustable toe peg 2 includes actuation lever 130 and toe peg assembly 100. The toe peg assembly 100 includes a toe peg 102 with a toe peg bore 104. The toe peg 102 is preferably formed of a flexible material, such as rubber. When formed from a flexible material, the toe peg 102 is installed by stretching over the toe peg axle 106. If formed from a stiffer material, the toe peg 102 may be formed of multiple pieces that are assembled over the toe peg axle 106, or the toe peg axle 106 may be formed from multiple parts and assembled after installation of the toe peg 102.

The toe peg axle 106 interfaces with toe peg rotating member 112, held in place by toe peg fastener 116 that passes through rotating member bore 118, then threaded into toe peg axle bore 108.

An optional toe peg axle protruding face 110 fits within a toe peg recessed face 114.

The toe peg rotating member 112 includes a rotating member projection 120 with optional projection screw channel 122.

The rotating member projection 120 is inserted into the first penetration 136 or second penetration 137 of the clamping segment 132, which in turn is part of the actuation lever 130. A compression fastener 142 inserted at compression fastener penetration 143 is used to create a clamping force, squeezing the clamping segment 132 around the rotation member projection 120, thereby maintaining the angular position of the toe peg rotating member 112.

When in use, the actuation lever 130 rotates about a pivot point 150, which changes the position of the linkage connection 154. The linkage connection 154 in turn actuates the shift mechanism or rear brake of the motorcycle (not shown).

Figure 9:
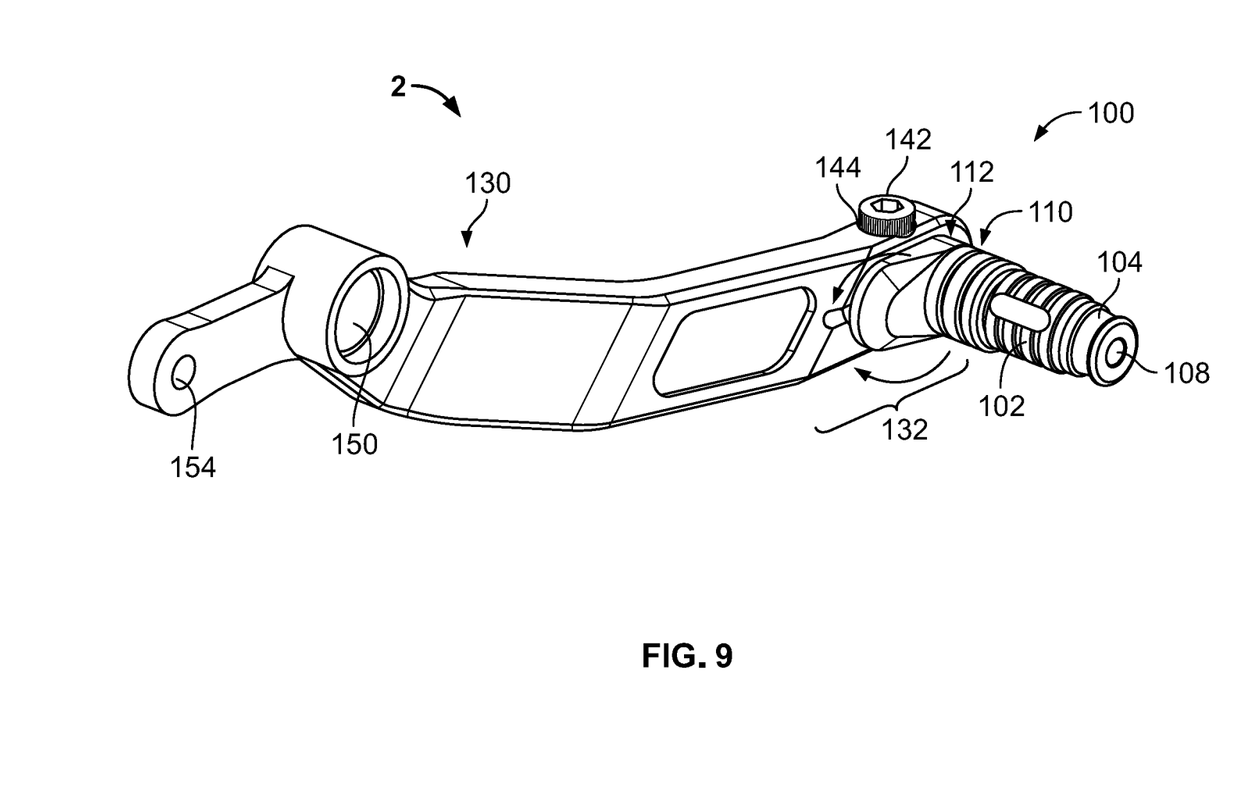
FIG. 9 is a collapsed view of the toe peg assembly.

Referring to FIG. 9, a collapsed view of foot peg assembly is shown.

The toe peg rotating member 112 is shown inserted into first penetration 136. Compression fastener 142 is inserted, squeezing the clamping segment 132 about the rotating member projection 120, holding the toe peg in place.

Figure 10:
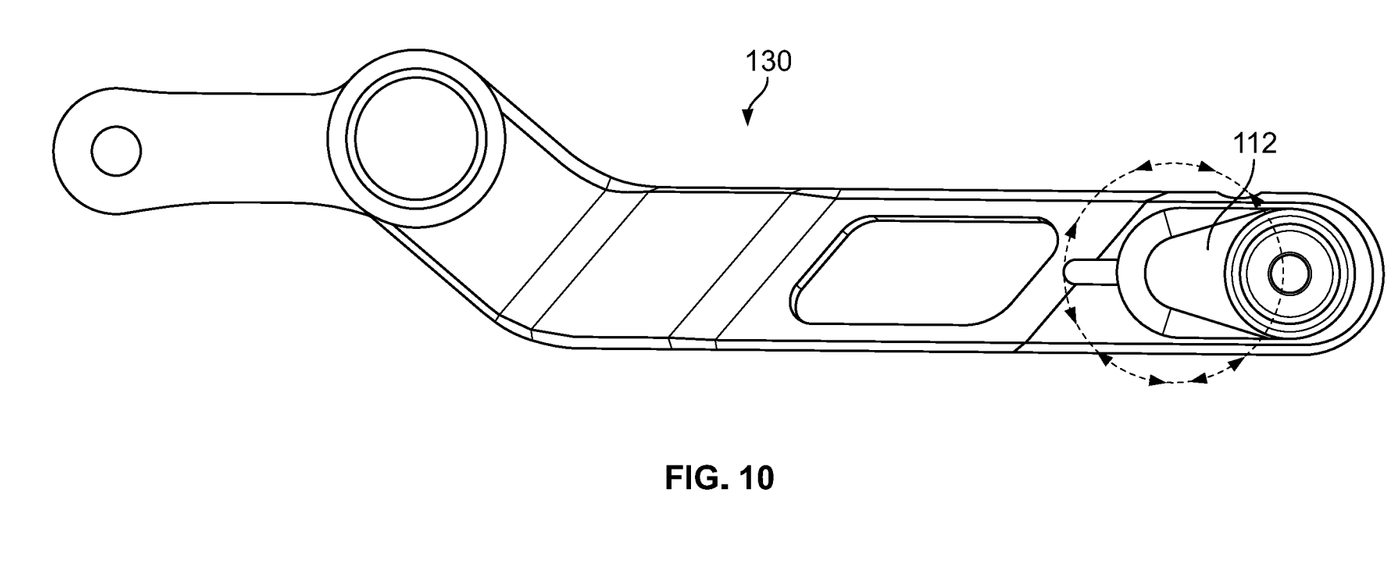
FIG. 10 is a front view of the toe peg assembly, showing angles of toe peg rotation.

Referring to FIG. 10, a front view of the toe peg assembly, showing angles of toe peg rotation is shown.

The toe peg rotating member 112 is held at any angle desired by the rider with respect to the actuation lever 130. Moving the rotating member projection from the first penetration 136 to the second penetration 137 results in another circle of potential toe peg placement positions.

Figure 11:
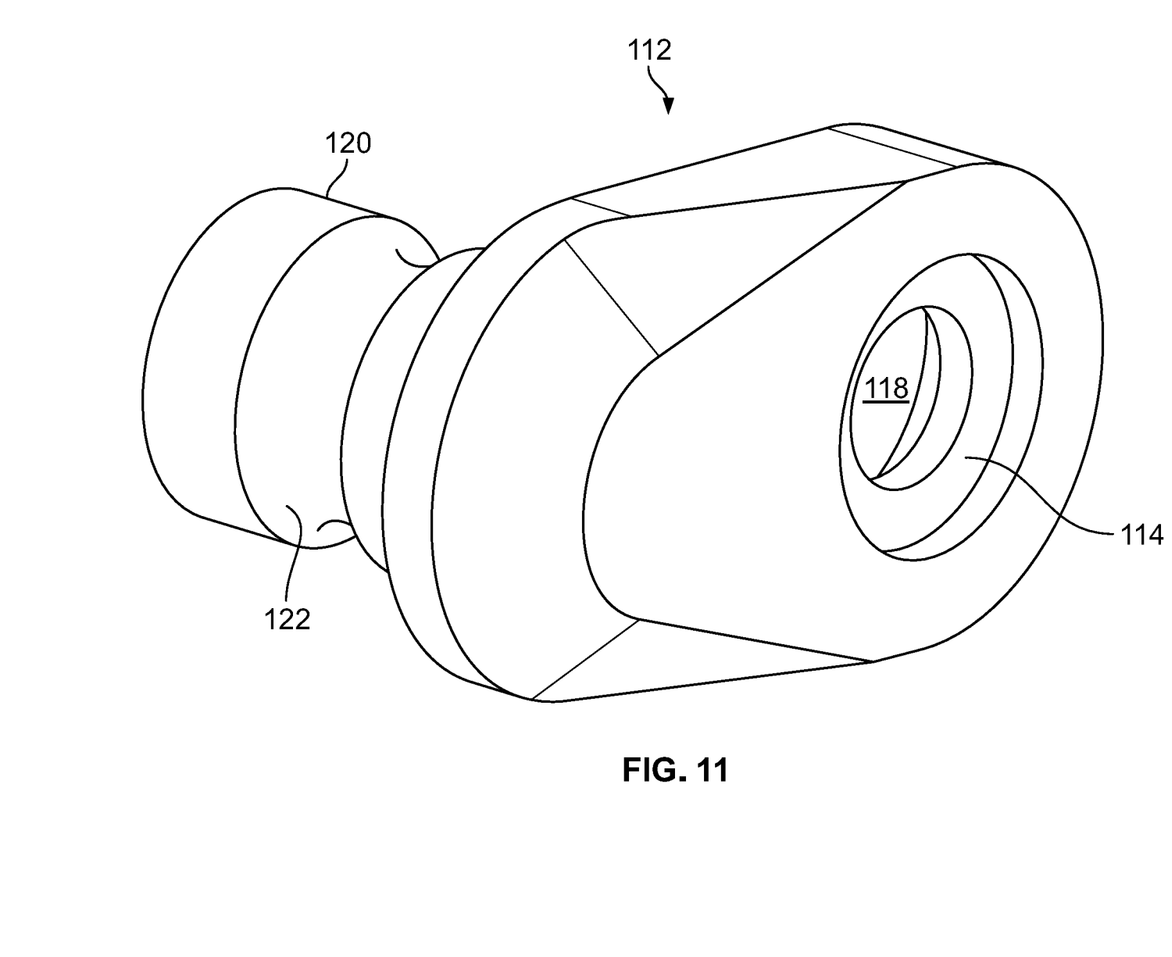
FIG. 11 is a close-up view of the toe peg rotating member.

Referring to FIG. 11, a close-up view of the toe peg rotating member is shown.

The toe peg recessed face 114 of the toe peg rotating member 112 is visible, as is a portion of the projection screw channel 122 of the rotating member projection 120.

Figure 12:
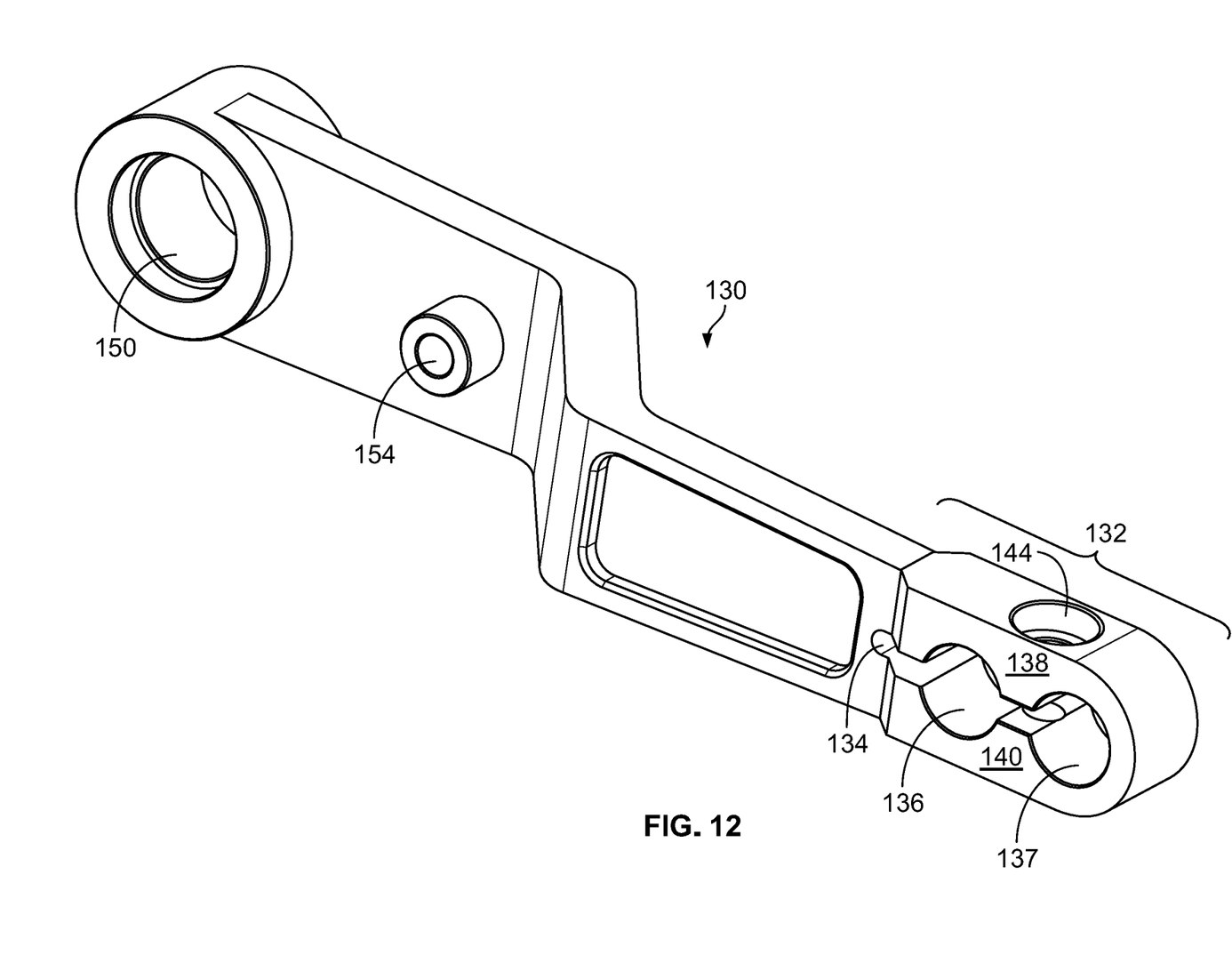
FIG. 12 is a view of a shift/brake lever, with a focus on the clamping end.

Referring to FIG. 12, a view of a shift/brake lever, with a focus on the clamping end, is shown.

The actuation lever 130 includes a clamping segment 132 that interfaces with the rotating member projection 120 (see FIG. 11) of the toe peg rotating member 112. The clamping segment 132 is divided into a clamp upper half 138 and clamp lower half 140. An optional cut 134 further divides the clamping halves 138/140 to ensure material does not impede clamping.

This embodiment is shown with a first penetration 136 and a second penetration 137, although any number of penetrations is permissible.

The compression fastener 142 (see FIG. 9) sits within an optional compression fastener countersink 144.

In contrast to an earlier embodiment of the actuation lever 130, this embodiment includes a pivot point 150 on an end opposite the clamping segment 132, with the linkage connection 154 between the ends.

Figure 13:
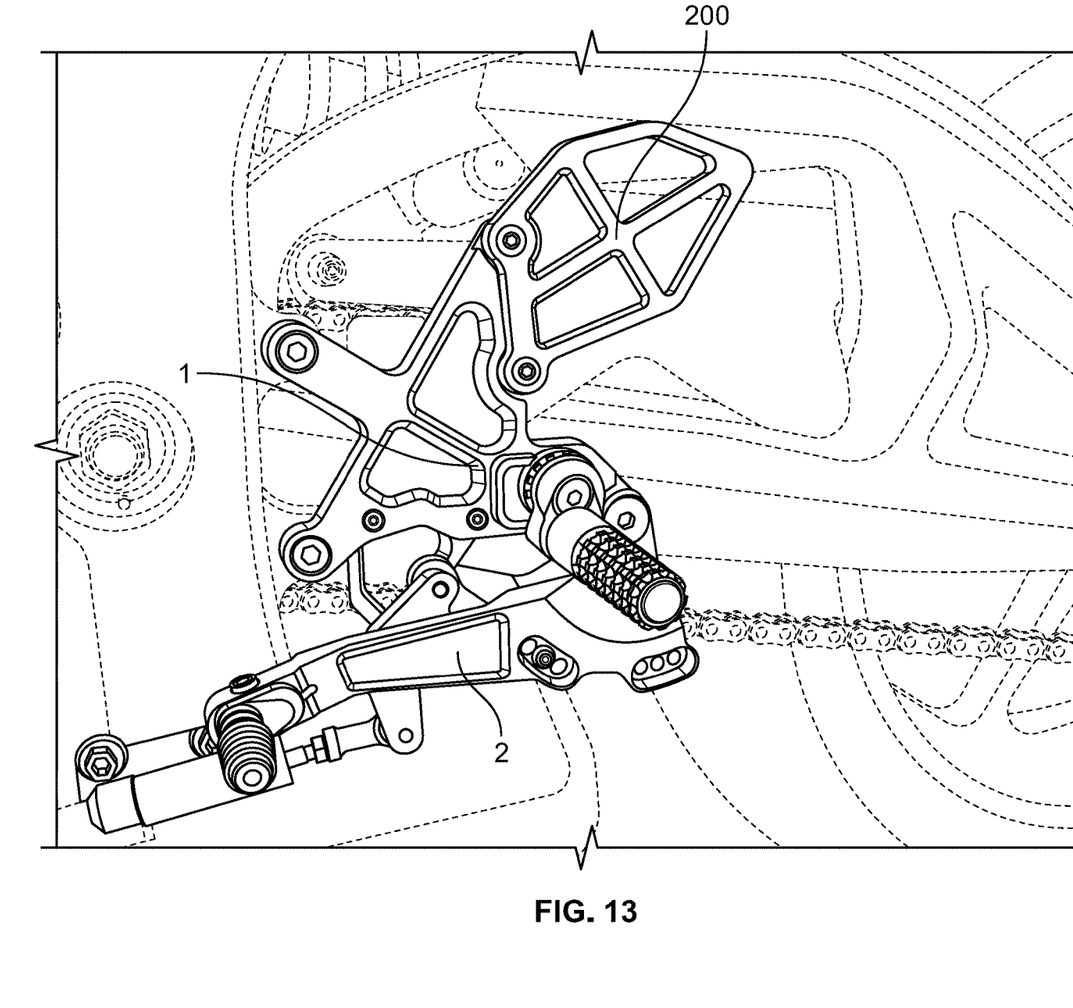
FIG. 13 is a view of a left side of an exemplary motorcycle, with the disclosed device operating the shifter.

Referring to FIG. 13, a view of a left side of an exemplary motorcycle facing to the left, with the disclosed device operating the shifter is shown.

The shift heel-guard 200 is shown attached to the rearset with adjustable foot peg 1, in turn shown in connection with the rearset with adjustable toe peg 2.

Figure 14:
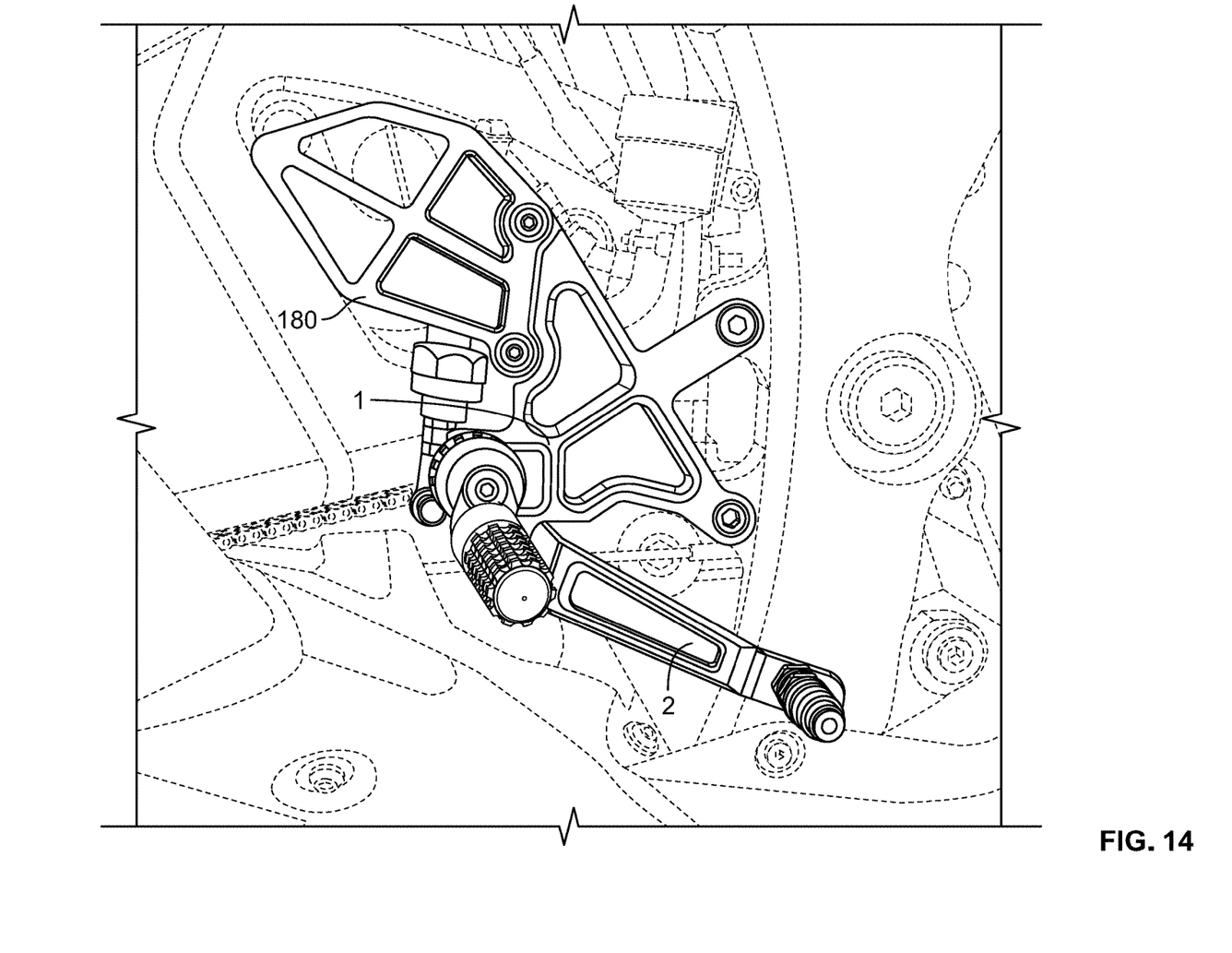
FIG. 14 is a view of the right side of an exemplary motorcycle, with disclosed device operating the brake.

Referring to FIG. 14, a view of the right side of an exemplary motorcycle facing to the right, with disclosed device operating the brake is shown.

The brake heel-guard 180 is shown attached to the rearset with adjustable foot peg 1, in turn shown in connection with the rearset with adjustable toe peg 2.

Equivalent elements can be substituted for the ones set forth above such that they perform in substantially the same manner in substantially the same way for achieving substantially the same results.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. An adjustable motorcycle toe peg assembly comprising:
   a toe peg rotating member;
      the toe peg rotating member comprised of a first end and a second end;
      the first end including a projection;
   an actuation lever with a clamping segment;
      the clamping segment including a first penetration;
      the projection fitting within the first penetration, the projection able to rotate within the first penetration;
   a clamping fastener that when tightened causes the clamping segment to compress the projection, thereby fixing the rotational position of a toe peg;
   wherein the projection includes a screw channel, the screw channel permitting the projection to partially enclose the clamping fastener without creating physical interference.

2. The adjustable motorcycle toe peg assembly of claim 1, wherein the clamping segment includes a second penetration, the projection able to be placed within either the first penetration or second penetration, thus permitting greater flexibility in placement of the toe peg.

3. The adjustable motorcycle toe peg assembly of claim 2, wherein the distance between the first penetration and the second penetration is less than a diameter of the clamping fastener; and
   the projection includes a screw channel, the screw channel permitting the projection to partially enclose the clamping fastener without creating physical interference.

4. The adjustable motorcycle toe peg assembly of claim 1, further comprising:
   the toe peg affixed to the first end of the toe peg rotating member;
   whereby the toe peg comes into contact with a rider's foot, allowing the rider to move the actuation lever up or down.

5. The adjustable motorcycle toe peg assembly of claim 4, wherein the toe peg is comprised of a toe peg sleeve that rotates on a toe peg axle, the toe peg axle affixed to the second end of the toe peg rotating member.

6. An adjustable toe peg for a motorcycle comprising:
   a toe peg;
   an actuation lever having a first penetration;
   a rotating member having a first end and a second end;
      the first end affixed to the toe peg;
      the second end including a protrusion that fits within the first penetration of the actuation lever;
      the first end rotating in a circle around the second end;
   a compression fastener;
   wherein the compression fastener is loosened to allow rotation of the rotating member, and tightened to prohibit rotation of the rotating member;
   wherein the protrusion includes a screw channel, the screw channel permitting the protrusion to partially enclose the compression fastener without creating physical interference; and
   whereby the position of the toe peg is adjustable based on the location of the rotating member when the compression fastener is tightened.

7. The adjustable toe peg for a motorcycle of claim 6, wherein the actuation lever includes a clamping segment that surrounds the first penetration, the clamping segment expanding and contracting to loosen or tighten the first penetration around the protrusion.

8. The adjustable toe peg for a motorcycle of claim 7, further comprising:
   a second penetration, the protrusion able to be placed within either the first penetration or second penetration, thus permitting greater flexibility in placement of the toe peg.

9. The adjustable toe peg for a motorcycle of claim 8, wherein the distance between the first penetration and the second penetration is less than a diameter of the compression fastener; and
   the protrusion including a screw channel, the screw channel permitting the protrusion to partially enclose the compression fastener without creating physical interference.

10. The adjustable toe peg for a motorcycle of claim 6, wherein the toe peg is comprised of a toe peg sleeve that rotates on a toe peg axle.

11. An adjustable toe peg for use operating the brake or transmission of a motorcycle, the adjustable toe peg comprising:
    a toe peg affixed to a rotating member, the rotating member in a rotational relationship with an actuation lever;
    the toe peg fixed in a chosen position by clamping a section of the actuation lever around the rotating member;
    wherein the rotating member interfaces with the actuation lever using a projection and a penetration;
    wherein the projection includes a screw channel, the screw channel permitting the projection to partially enclose a clamping fastener without creating physical interference.

12. The adjustable toe peg for use operating the brake or transmission of a motorcycle of claim 11, further comprising:
    a clamping fastener;
    whereby loosening the clamping fastener allows the rotating member to rotate with respect to the actuation lever, and tightening the clamping fastener prevents rotation.

13. The adjustable toe peg for use operating the brake or transmission of a motorcycle of claim 12;
    wherein the actuation lever includes a first penetration and a second penetration;
    the first penetration and second penetration tightened and loosened by the clamping fastener;
    wherein the distance between the first penetration and the second penetration is less than a diameter of the clamping fastener; and
    the projection includes a screw channel, the screw channel permitting the projection to partially enclose the clamping fastener without creating physical interference.

14. The adjustable toe peg for use operating the brake or transmission of a motorcycle of claim 11, wherein the toe peg is comprised of a toe peg sleeve that rotates on a toe peg axle, the toe peg axle affixed to the rotating member.

* * * * *